United States Patent
Freund et al.

(10) Patent No.: US 12,321,390 B2
(45) Date of Patent: Jun. 3, 2025

(54) SO-MAP: A SEMANTIC-AWARE ALGORITHM FOR OPTIMIZING THE REPRESENTATION STRUCTURE OF OCTOMAPS

(71) Applicant: Dell Products L.P., Round Rock, TX (US)

(72) Inventors: Werner Spolidoro Freund, Rio de Janeiro (BR); Pablo Nascimento da Silva, Niterói (BR); Vinicius Michel Gottin, Rio de Janeiro (BR); Paulo Abelha Ferreira, Rio de Janeiro (BR); Julia Drummond Noce, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/049,700

(22) Filed: Oct. 26, 2022

(65) Prior Publication Data

US 2024/0143655 A1    May 2, 2024

(51) Int. Cl.
*G06F 16/00*  (2019.01)
*G06F 16/901* (2019.01)

(52) U.S. Cl.
CPC ............................... *G06F 16/9024* (2019.01)

(58) Field of Classification Search
CPC ..................... G06F 16/9024; G06F 16/9027
See application file for complete search history.

(56) References Cited

U.S. PATENT DOCUMENTS

| | | |
|---|---|---|
| 8,261,033 B1 | 9/2012 | Slik et al. |
| 10,142,353 B2 | 11/2018 | Yadav et al. |
| 10,429,197 B1 | 10/2019 | Carrino et al. |
| 10,584,971 B1 | 3/2020 | Askeland |
| 10,964,097 B2 | 3/2021 | Teply et al. |
| 11,157,527 B2 | 10/2021 | Wang et al. |
| 11,227,401 B1 * | 1/2022 | Mahieu ................. G01S 17/89 |
| 11,312,379 B2 * | 4/2022 | Taylor ................ G01C 21/3841 |
| 11,314,254 B2 * | 4/2022 | Macias ............... G05D 1/0202 |
| 11,402,830 B2 | 8/2022 | Sullivan et al. |
| 11,436,504 B1 * | 9/2022 | Lukarski ................. G06N 5/04 |
| 11,595,269 B1 | 2/2023 | Ghosh et al. |

(Continued)

FOREIGN PATENT DOCUMENTS

| | | |
|---|---|---|
| CN | 110537078 A | 12/2019 |
| CN | 116368355 A | 6/2023 |
| WO | 2020/112827 A2 | 6/2020 |

OTHER PUBLICATIONS

Hubel et al., Coverage Control with Information Decay in Dynamic Environments, 2008.

(Continued)

*Primary Examiner* — Leslie Wong
(74) *Attorney, Agent, or Firm* — Workman Nydegger

(57) ABSTRACT

Systems and methods for decoupling information into multiple levels of detail based on semantics while providing a compact global representation structure. A tree-based graph represents objects in an environment. The top node provides complete environment information at the lowest level of detail. Leaves of the tree-based graph complement the parent nodes with more detailed local information. This achieved efficient processing, communication, and data compaction.

16 Claims, 11 Drawing Sheets

(56) References Cited

U.S. PATENT DOCUMENTS

| | | |
|---|---|---|
| 11,792,262 B1 | 10/2023 | Chung et al. |
| 11,819,734 B2 | 11/2023 | Lee et al. |
| 2002/0152318 A1 | 10/2002 | Menon et al. |
| 2010/0045701 A1 | 2/2010 | Scott et al. |
| 2012/0090667 A1 | 4/2012 | Cap et al. |
| 2013/0307720 A1 | 11/2013 | Lilburn |
| 2014/0278517 A1 | 9/2014 | Patel et al. |
| 2014/0309841 A1 | 10/2014 | Hara et al. |
| 2016/0071278 A1 | 3/2016 | Leonard et al. |
| 2016/0292908 A1 | 10/2016 | Obert |
| 2016/0359872 A1 | 12/2016 | Yadav et al. |
| 2017/0248963 A1 | 8/2017 | Levinson et al. |
| 2017/0317920 A1 | 11/2017 | Rocquelay et al. |
| 2018/0137390 A1 | 5/2018 | Brundage et al. |
| 2018/0137675 A1 | 5/2018 | Kwant et al. |
| 2018/0173239 A1 | 6/2018 | Yoon et al. |
| 2018/0222043 A1 | 8/2018 | Trovero et al. |
| 2019/0043246 A1 | 2/2019 | Teply et al. |
| 2019/0163191 A1* | 5/2019 | Sorin .................. G05D 1/0274 |
| 2019/0285396 A1 | 9/2019 | Yao et al. |
| 2020/0026292 A1 | 1/2020 | Douillard et al. |
| 2020/0036595 A1* | 1/2020 | Wallerstein ............. H04L 41/12 |
| 2021/0021485 A1 | 1/2021 | Guim et al. |
| 2021/0140773 A1 | 5/2021 | Ondruska et al. |
| 2021/0144517 A1 | 5/2021 | Guim et al. |
| 2021/0150771 A1* | 5/2021 | Huang .................... G01S 17/89 |
| 2021/0169417 A1 | 6/2021 | Burton |
| 2021/0187391 A1 | 6/2021 | Ekkati et al. |
| 2021/0233390 A1 | 7/2021 | Georgiou et al. |
| 2021/0302260 A1 | 9/2021 | Baggs et al. |
| 2022/0082408 A1 | 3/2022 | Montemerlo et al. |
| 2022/0129426 A1 | 4/2022 | Sohail et al. |
| 2022/0131934 A1 | 4/2022 | Oku et al. |
| 2022/0138966 A1 | 5/2022 | Sung et al. |
| 2022/0147407 A1 | 5/2022 | Asgar et al. |
| 2022/0187841 A1 | 6/2022 | Ebrahimi et al. |
| 2022/0200917 A1 | 6/2022 | Mortensen et al. |
| 2022/0203165 A1 | 6/2022 | Lee et al. |
| 2022/0204019 A1 | 6/2022 | Lauterbach et al. |
| 2022/0245111 A1 | 8/2022 | Harrison et al. |
| 2022/0329650 A1 | 10/2022 | Zhang et al. |
| 2022/0413989 A1 | 12/2022 | Karri et al. |
| 2023/0005217 A1* | 1/2023 | Chen ...................... G06N 20/00 |
| 2023/0071442 A1 | 3/2023 | Tripathy et al. |
| 2023/0106877 A1 | 4/2023 | Simeonov et al. |
| 2023/0117081 A1 | 4/2023 | Hunter et al. |
| 2023/0156074 A1 | 5/2023 | Kim et al. |
| 2023/0161041 A1 | 5/2023 | Schindler et al. |
| 2023/0231903 A1 | 7/2023 | Zeng |
| 2023/0237064 A1 | 7/2023 | Bao |
| 2023/0275834 A1 | 8/2023 | Huang |
| 2023/0291794 A1 | 9/2023 | Bartholomew et al. |
| 2023/0297356 A1 | 9/2023 | Hudson |
| 2023/0376558 A1 | 11/2023 | Seyfi et al. |
| 2024/0050803 A1 | 2/2024 | Lee et al. |
| 2024/0144174 A1* | 5/2024 | Freund ................. G06Q 10/087 |
| 2024/0362808 A1 | 10/2024 | Del et al. |

OTHER PUBLICATIONS

U.S. Appl. No. 18/050,274, filed Oct. 27, 2022, titled Orchestration of Action-Input Representations for Decision Making in Edge Environments.

Hornung, A. et al. (2013) 'OctoMap: An efficient probabilistic 3D mapping framework based on octrees', Autonomous Robots, 34(3), pp. 189-206. doi:10.1007/s10514-012-9321-0.

Wurm, K.M. et al. (2011) 'Hierarchies of Octrees for Efficient 3D Mapping', (Sep.). doi:10.1109/IROS.2011.6048189.

Dahmen et al, "Verification and validation of Digital twins and virtual testbed," International Journal of Advances in Applied sciences, vol. 11, no 1, 2022.

Errandonea, Itxaro et al., "Digital Twin for Maintenance: A literature review", Computers in Industry 123 103316, Elsevier, Oct. 5, 2020.

McMahan, Communication-Efficient Learning of Deep Networks from Decentralized Data, version 3, Feb. 28, 2017, Artificial Intelligence and Statistics, pp. 1273-1282.

Tao, F et al., "Chapter 2—Applications of Digital Twin", Digital Driven Smart Manufacturing, Feb. 15, 2019, pp. 29-62, https://doi.org/10.1016/B978-0-12-817630-6.00002-3.

N. Hubel, A. Gusrialdi, H. Fujita, and O. Sawodny, "Coverage Control with Information Decay in Dynamic Environments," Jan. 2008.

* cited by examiner

SO-MAP: A SEMANTIC-AWARE ALGORITHM FOR OPTIMIZING THE REPRESENTATION STRUCTURE OF OCTOMAPS

FIELD OF THE INVENTION

Embodiments of the present invention generally relate to logistics operations. More particularly, at least some embodiments of the invention relate to systems, hardware, software, computer-readable media, and methods for logistics operations, including positioning and mapping operations, for devices or objects operating in environments.

BACKGROUND

A smart environment may include multiple objects operating in the environment. The logistics may be orchestrated at the objects and/or at a central location (e.g., a near edge or central system). However, there are many scenarios where performing the logistics operations is hindered by resource constraints.

For example, some environments are large in size and a large number of objects operate therein. These factors and others contribute to resource constraints. Attempts to resolve these issues include using frameworks such as an OctoMap framework. However, this framework breaks down in edge applications and does not resolve resource constraints.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
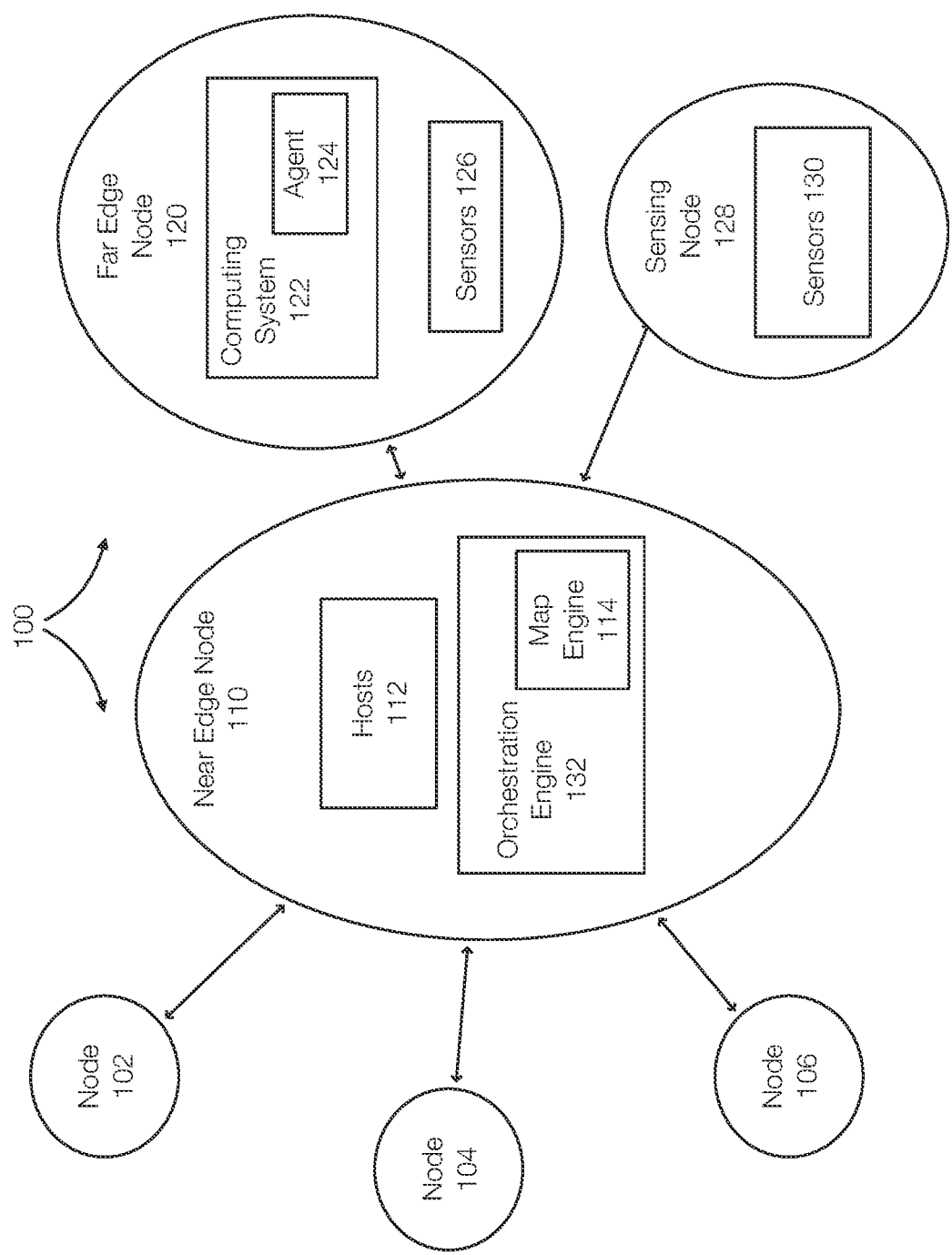
FIG. 1 discloses aspects of an environment in which logistics operations are performed and managed using a tree-based graph.

Embodiments of the present invention generally relate to logistics. More particularly, at least some embodiments of the invention relate to systems, hardware, software, computer-readable media, and methods for logistics operations, which include managing and controlling objects/devices in an environment.

Logistics operations may be performed using various representations, an example of which is an OctoMap. Conventionally, however, a global OctoMap representation eventually scales out of the available near edge node transient memory. Breaking down the global information without impacting the orchestration or provisioning of regions of interest (RoIs) is not resolved. Manual segmentation can be applied, but manual segmentation is application specific and may result in inefficiencies due the environment dynamics. Likewise, distributing the global state into several computational nodes is also difficult because each algorithm would require defining its own segmentation strategy.

Far edge nodes (e.g., the objects or other data sources in the environment) provide local information to a near edge node. The local information may include observations from sensors, location data, and current actioning status. The information is transmitted on channels shared across several far edge nodes. Static sensing nodes may provide complementary information and, in some cases, also share these channels. Even when the number of far edge nodes or sensing nodes per channel is reasonably balanced, the number of nodes per channel can be high enough to prevent or impact the communication abilities of all far edge nodes collectively.

The near edge node provides up-to-date environmental information to the far edge nodes by leveraging the global map built upon information of all sensors. However, this also occurs on channels shared across several far edge nodes and suffers from similar resource constraints. Another bottleneck occurs when the far edge nodes depend on the near edge to update its local map information. This can also impact the far edge efficiency even when the far edge node can process its own local representation.

A tree-based representation or graph with each graph node containing mutually exclusive information about the environment requires all fragmented information to be collected in order to have a view of the global state. Without a unique global map, such processing must be performed online at each time step adding processing overhead to the system.

Given algorithms that can be performed efficiently at different levels-of-detail, the assembled global state must be performed at the most granular information level or be performed multiple times in parallel to provide the optimal level-of-detail for each algorithm. This leads to overhead due to processing of frivolous information or due to multiple generations of the global state. By relying solely on occupancy information to define its structure, a unique global OctoMap keeps frivolous information to be processed by every orchestration algorithm. These algorithms must be computed frequently and must be low latency for the orchestration task to be efficient. The processing of superfluous information places additional strain in the near edge.

Embodiments of the invention overcome some of these issues using a tree-based graph that is based in part, in some examples, on an OctoMap.

Embodiments of the invention relate to a relationship between nodes in a graph (graph nodes) and objects in an environment (far edge nodes or sensing nodes). Due to the tight interaction, reference to a "node" herein may be either or both the graph nodes and the corresponding physical node. Further reference to a graph node may have an implicit reference to the corresponding physical node and/vice versa even if not explicitly stated. For example, when updating a graph node as discussed herein, it is understood that the corresponding physical node may be updated or that the update to the graph or physical node is in response to data generated in the environment.

Logistics operations, by way of example, may be performed in environments (e.g., a warehouse) that includes objects such as autonomous robots or forklifts, or other devices. These objects are examples of far edge nodes (or nodes) that may communicate with a central node (e.g., a near edge node), which may operate in a cloud or edge environment. The logistics operations, by way of example, may be performed at the central or near edge node and/or at the far edge nodes.

Embodiments of the invention facilitate logistics operations using a multi-dimensional map (e.g., a 3D map) that may be stored and updated at the near edge node. The map is maintained/updated based on information received from the far edge nodes and/or sensing nodes in the environment. Portions of the map may be distributed to the far edge nodes as needed. Based on the global state represented by the global map, the near edge node may communicate decisions or other information to the nodes.

The near edge node may include an orchestration or logistics engine that may be configured to determine or compute real-time decisions based, at least in part, on a global state of the dynamic environment represented as a 3D (three-dimensional) map or graph built/maintained in part from data streams received from the far edge and/or sensing nodes. The far edge nodes (and/or sending nodes where appropriate) rely on the near edge node to provide an updated local map (a portion of the global map) and/or may benefit from the map or a portion thereof to properly interact with the environment.

Embodiments of the invention may represent the far edge and/or sensing nodes in the environment using a tree-based structure or graph (an example of a global map) that help alleviate resource constraints in the environment. In one example, the environment may be represented using a mapping framework, such as an OctoMap framework. Embodiments of the invention, however, alter and adapt this framework in a manner that, for example, addresses various types of resource constraints. Generally, this type of framework allows an environment to be tessellated or divided into spaces, which are often referred to as voxels.

Embodiments of the invention may represent the near edge node, the far edge nodes and the sensing nodes using a tree-based graph that disperses information to multiple levels of detail based on semantics while providing a compact global representation structure. The top graph node, which may represent the near edge node, may provide complete information at the lowest level of detail. The leaf nodes complement the parent nodes in the graph with more detailed local information. This leads to more efficient processing, communication, and data compaction by avoiding the need to perform operations on frivolous information.

In one example, the semantics may include a group of terms that are relevant for tasks that may be performed in an environment. Some of the terms may relate to objects operating in the environment. In a warehouse environment, by way of example, the semantics may include terms such as robots, forklift, shelf, goods, pallet, container, box, and/or other terms relevant to the domain or environment. In one example, a semantic class determines a group of objects that can be treated as a single group when considering the tasks performed in the environment, therefore reducing the modeling complexity.

In one example, the tree-based graph (or graph) represents objects operating in an environment. More specifically, each node of the graph may correspond to an object in the environment. More specifically, the graph nodes correspond to the far edge and sending nodes. Embodiments of the invention may create/maintain/update the graph as information is received from the environment and/or as objects interact with other objects in the environment or simply perform actions in the environment.

More generally, the near edge node may use external information received from the far edge nodes and the sensing nodes to perform logistics operations including decision making operations. In one example, the roles of objects can be determined semantically, and this information allows the near edge node to perform decisions on how the nodes in the environment should interact with the environment.

For example, a forklift may correspond to a graph node in the graph. Pallets in the environment may also be examples of objects that correspond to graph nodes in the graph. If a forklift picks up a specific pallet, this interaction between the forklift and the pallet is an example of information that may be reported back to the near edge node. This allows the near edge node to update the graph and ensure that the pallet now carried by the forklift is a child node of the graph node corresponding to the forklift. The goods on the pallet may also be examples of objects and may be represented in the graph (or map) as child nodes of the pallet node. The level of detail at each graph node in this chain (forklift-pallet-goods) may vary in level of detail. The detail may be sufficient to allow the corresponding far edge node to perform any relevant functions. For example, the forklift may only need to know that a certain pallet is being moved from one location to another. Information relating to the goods may not be needed for the forklift to perform its functions.

This generally represents the ability of far edge nodes to perform functions without having to rely on or process data that may not be necessary. When determining whether two forklifts are on a collision course, the contents of goods inside boxes on the pallet may not be relevant to the determination or any decision resulting generated by the near edge node from the analysis. This improves processing performance as certain information (information not relevant to the decision) is not processed. At the same time, network bandwidth may be conserved by properly managing how information is distributed between the near edge node and the far edge nodes in the environment.

This illustrates that graph relationships allow the state of the environment to be known. Thus, in this example, it is known that goods are on a pallet being carried by a particular forklift. When the pallet is deposited in a location, updating the node may sever the parent/child relationship and place the pallet as a child node of a node representing a shelf.

The level of detail at each graph node may depend on the location of the graph node in the graph. Compared to lower-level graph nodes, higher level graph nodes of the graph may store information about a greater portion of the environment, but at a lower level of detail. The level of detail required at a given graph level or graph node may depend on processing requirements and environment semantics.

As previously discussed, the graph may alleviate several bottlenecks that may otherwise exist for various reasons (e.g., large number of nodes) including resource constraints. Example bottlenecks or issues may include: (1) constraints in processing time at the near edge node; (2) transient memory limitations at the near edge node; (3) communication bottlenecks from the far edge nodes to the near edge node; (4) communication bottlenecks from the near edge node to the far edge nodes; (5) extra processing due to fragmented information; and (6) efficiency limited by having a multi-resolution map.

In one example, a graph or map is built where the top graph node provides complete environment information at the lowest possible level-of-detail and the leaves or other graph nodes complement the parents with more detailed local information. This graph allows logistic operations to be performed.

The process of acquiring information, distributing information, making decision, and performing actions requires information to be collected and distributed. Embodiments of the invention use a graph or map and a pipeline to achieve this distribution. Embodiments of the invention operate to ensure that data is transmitted efficiently and in a manner that allows decisions to be made using relevant data at the lowest level of detail. The pipeline includes the following steps: (1) obtain a set of measurements from the far edge and/or sensing nodes; (2) associate the measurements to a graph node; (3) create a new graph node if no association is found; (4) update the graph node; (5) update parents of the graph node; (6) update free space voxels; (7) prune inexistent child graph nodes.

In addition to this graph (or other structure), embodiments of the invention further relate to updating this graph given the resources of a near edge node and the resources of the far edge nodes. Embodiments of the invention enable efficient processing, communication, and data compaction by avoiding operations on frivolous information. The logistics operations disclosed here include creating and maintaining a multi-resolution global state of the environment that is readily available to be provided on-demand and/or processed at the required level-of-detail using semantic information.

Embodiments of the invention thus relate to logistic operations that may be performed in an environment. The logistics operations may relate to the operation of objects in the environment. Generally, objects (or devices) in an environment may be mobile, movable, or stationary. Example objects or devices may include autonomous robots (e.g., forklifts), pallets, pillars, boxes, goods, or the like. The objects may have different computing resources (e.g., processor, memory, networking). For example, an autonomous robot may have processor, memory, and networking. Other devices, such as a pallet, may only include hardware that can be read (e.g., a radio frequency tag—RFID). These objects or devices may be generally referred to as nodes.

The nodes may communicate with a near edge node, also referred to as a central node. A central node may be implemented in near edge or edge infrastructure and/or in a cloud environment. A central node has comparatively more computing resources than the far edge nodes. A central node may have multiple computing devices (e.g., servers, hosts).

FIG. 1 discloses aspects of an environment in which logistics operations may be performed. In FIG. 1, multiple far edge nodes, represented by the nodes 102, 104, 106, and 120, may operate in an environment 100. The far edge nodes may have different functionality, responsibilities, or purposes. The far edge node 120 is an example of a mobile and/or autonomous far edge node, such as a robot, a forklift, or the like. The far edge node 120 may have a computing system 122 in which an agent 124 operates.

The agent 124 is configured to communicate with a near edge node 110 and/or other agents. For example, the agent 124 may receive information or data from the near edge node 110. The data may include mapping information, commands, instructions, decisions, or the like. The information received by the agent 124 may be based on the tree-based graph or map. In one example, the near edge node 110 may provide information related to a region of interest, which is based in part on a position of the node 120 in the environment 100. The information provided to the agent 124 may be relevant to that specific region of interest (RoI). The region of interest may be defined by a bounding box and multiple objects may be included within the bounds of the bounding box.

The agent 124 may also be configured to receive or collect data from sensors 126. The sensors 126 may be associated with the far edge node 120 and may generate inertial data, position data, or the like. The sensors 126 of a particular far edge node may depend on the characteristics of the far edge node. For example, if the far edge node 120 is a forklift, the sensors 126 may include inertial sensors, position sensors, proximity sensors, mast position sensors, load weight sensors, or the like. The agent 124 receives sensor data and transmits the sensor data to the near edge node 110. In some examples, the agent 124 may include a machine learning model that allows decisions to be performed at the far edge node 120 using the sensor data and/or information received from the near edge node 110. In other examples, the near edge node 110 processes the sensor data to make decisions, generate inferences, or the like, which are then transmitted back to the far edge node 120. For example, the near edge node may be able to determine that one robot is on a collision course with another robot. This allows a decision to be sent to at least one of the robots to change its trajectory.

The sensing node 128 may be an example of a movable or of a stationary node. For example, the sensing node 128 may be a camera that generates a video stream. In essence, the sensors 130 of the sensing node 128 include a camera in this example. The sensing node 128 may be an RFID tag, a microphone, a thermometer, or other sensor that may not require input from a near edge node to operate. Further, the sensing node 128 may only broadcast data to the near edge node 110. The sensing node 128 may not have computing resources other than what is necessary to function as a camera. Stated differently, some embodiments of the sensing node 128 do not perform functions and may not need to receive information from the near edge node 110.

In another example, the sensing node 128 may be a pallet (movable). The sensors 130 of a pallet may include RFID tags so that the position of the pallet can be measured, or inertial or other sensors that allow movement of the pallet to be determined, detected, and/or recorded.

If the far edge node 120 is a forklift and the sensing node 128 is a pallet, this type of information can be semantically included or represented in the graph or map. For example, if the sensing node 128 (the pallet) is loaded onto the far edge node 120, the graph or map may be updated to reflect a parent-child relationship between these two objects in the environment. Once the pallet is delivered or placed in a location, this relationship will be updated.

The near edge node 110 includes hosts 112 (e.g., physical machines, virtual machines, containers) that are configured to process data received from the far edge nodes 102, 104, 106, 120, and the sensing 128 in the environment 100, generate inferences, send instructions (e.g., to implement decisions made at the near edge node 110), generate mappings, update map or graph information, or the like.

The near edge node 110 further includes an orchestration engine 132 that is configured to orchestrate the updating of information between the near edge node 110 and the nodes

102, 104, 106, 120 and 128 including the generating and/or updating of a mapping framework for modeling the environment 100. The orchestration engine 132 includes a map engine 114 for generating and/or updating the mapping framework. In one example, the near edge node 110 implements a mapping framework that allows the environment 100 to be modeled as a tree-based data structure of regular occupancy grid space representations (voxels). Embodiments further relate to a semantic framework that may be integrated or associated with a map of the environment. This framework representations allow environments to be stored and represented in a computationally efficient (e.g., processing, memory) manner. Conventional OctoMaps are not optimized using semantic information whereas embodiments of the invention may provide an improved or optimized framework that uses sematic information and/or alleviates or reduces resource constraint problems.

An example graph (or map) is described. By way of example, a graph G has graph nodes with a quintuplet form: $n_i=(m_i, t_i, p_i, C_i, l_i)$. For a generic graph node i, $m_i$ is an OctoMap (by way of example only), $t_i$ is a reference frame of the node (6D transform), $p_i$ is a parent node reference, $C_i$ is a set or references of child nodes, and $l_i$ is a semantic label. Additional information may be added to each graph node whenever required.

The following functions may be used in the graph G:
Labeling function: $L \to Z: \mathcal{L}$: where $\mathcal{L}$ is a space of labels;
Association function: $f_A \to Z$: M, where Z is a space of a set of measurements and M is a space of map nodes and $f_A$ is a compound function that includes $L(\cdot)$;
Spatial relationship function: $r \to M \times M: \{0,1\}^{m \times m}$, where m is the cardinality of M.
Updating the graph G can be summarized as follows:
Obtain a set of measurements (e.g., sensor data from far edge and/or sensing nodes in the environment);
Use $f_A$ to retrieve a node $n_i$;
If $n_i \neq \emptyset$:
  Update information of node $n_i$;
Else:
  Use $r(.,.)$ to retrieve possible tree or graph positions and resolve ambiguities by picking deepest possible graph node;
  Create and place new node as its child;
  Populate all remaining quintuplet information, particularly with $m_i$ maximum resolution set to a function of $l_i$.

Embodiments of the invention can be adapted to update child nodes where free space is observed, update the node position on the graph, account for multiple nodes associated with the same object, the time of the last node update, or the like.

Embodiments of the invention may use a graph to decouple information into multiple levels-of-detail based on semantics while providing a compact global representation. In one example, a top graph node provides complete environment information at a low level-of-detail. The leaf nodes complement parent nodes in the graph with more detailed local information. This provides efficient processing, communication, and data compaction and avoids performing operations on frivolous information. For example, the near edge node, may perform processing based on the lowest level-of-detail and avoids processing higher level-of-detail that may not be needed.

Figure 2:
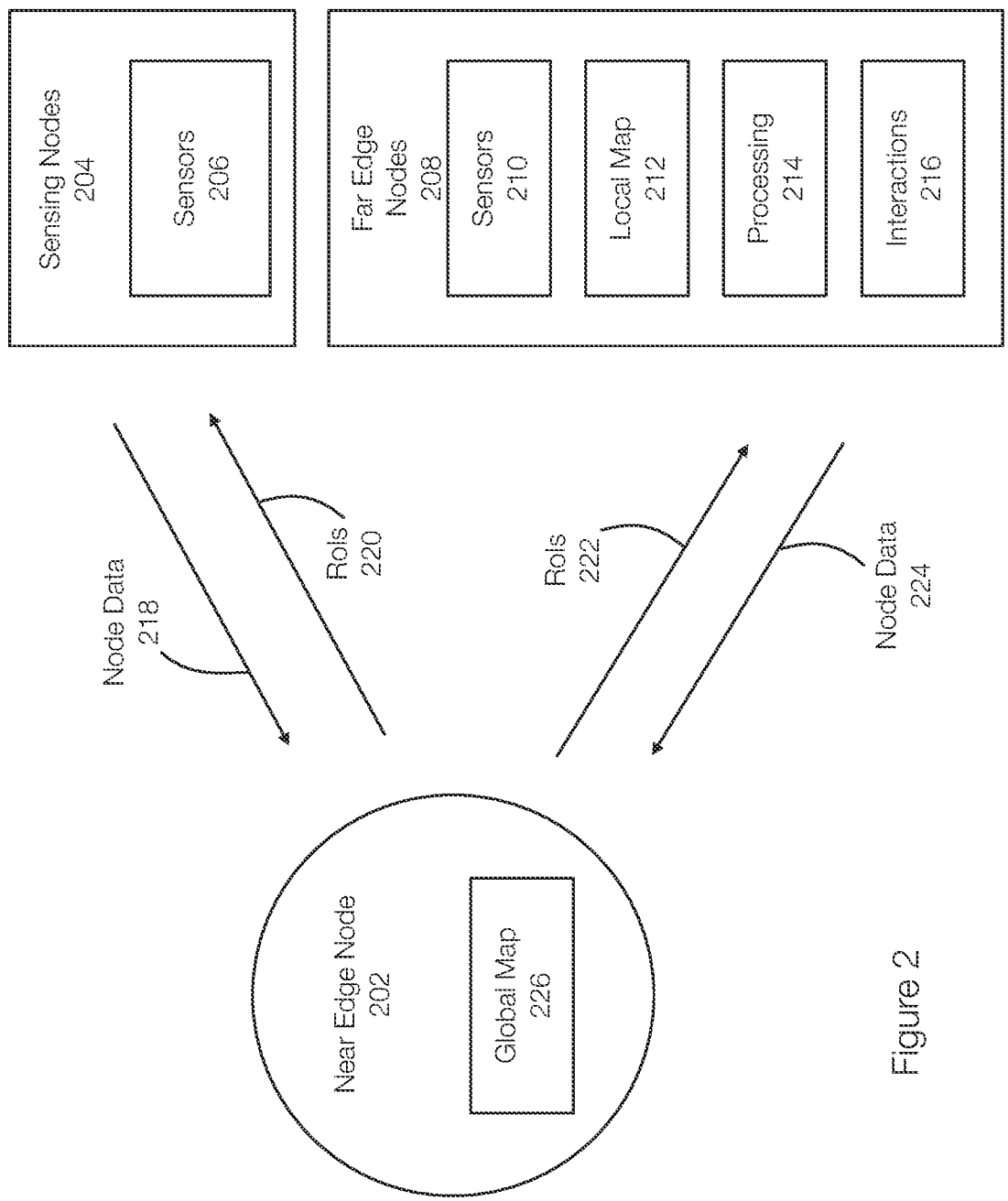
FIG. 2 discloses aspects of a central or near edge node that used data and interactions from far edge nodes in decision making operations.

FIG. 2 discloses aspects of a global map or graph that can be distributed in pieces. FIG. 2 illustrates a near edge node 202 that communicates with nodes, represented by sensing nodes 204 and far edge nodes 208, in an environment. The sensing nodes 204 may be, by way of example only, movable or stationary and may include sensors 206. In a warehouse environment, pallets, boxes, goods, shelves, corners, doors, entries/exits, other structural features (e.g., walls, corners) may be examples of the sensing nodes 204 and may be configured to provide information (sensor data or sensor data streams) to the near edge node. For example, a door may be a sensing node when configured to convey information such as open or shut. These sensing nodes 204 may include or be associated with sensors 206 such as cameras, open/shut sensor, state, directional sensors, microphones, or the like or combination thereof. Some of the sensing nodes 204 may only generate data streams that are provided to the near edge node 202. Others of the sensing nodes 204 may have sensors that can be read (e.g., RFID tags) by one or more RFID readers such that data such as position can be determined at the near edge node 202. The sensors 206 may be domain dependent.

The far edge nodes 208 may also include sensors 210 and processing 214. This allows the far edge nodes 208 to perform various functions. For example, data from the sensors 210 may be at least partially processed at the far edge nodes 208. The far edge nodes 208 may be capable of performing decisions locally.

Generally, node data 218 from the sensors 206 and node data 224 from the far edge nodes 208 is transmitted to the near edge node 202. The comparatively more powerful computing resources allows the near edge node 202 to process the node data 218, 224 at least in the context of performing logistics operations. The node data 218, 224 allow the near edge node 202 to make decisions that can be transmitted back to the far edge nodes 208 and to the sensing nodes 204 as appropriate or needed. This allows actions or functions of the nodes far edge 208 and/or the sensing nodes 204 to be controlled or initiated remotely. For example, the node data 224 may indicate that a collision is likely to occur. The near edge node 202 may send an instruction to stop movement or other remedial action to one or more specific nodes. More generally, using the node data 218 and 224, the near edge node 202 can perform decisions on how the objects or far edge nodes interact with the environment.

The node data 224 from the far edge nodes 208 may also include interactions 216. Interactions 216 may include opening a door, moving a pallet, positioning an object, turning a corner, raising a mast, or the like. The interactions 216 can include interactions by the nodes individually or may include multiple nodes. This information can be used when updating the graph nodes in the graph.

When the near edge node 202 is making decisions, inferences, or the like, the near edge node 202 may rely on external information such as the node data 218, 224 and interactions 216.

The near edge node 202 is associated with a global map 226 (e.g., a tree-based graph). The global map 226 represents objects (far edge nodes and sensing nodes) in the environment. IN one example, some of the sensing nodes and some of the far edge nodes may not be represented as a graph node in the graph. Representation in the graph may depend on the semantics definition. Each graph node of the graph may include an octomap. The graph nodes, which may each represent an object (e.g., a far edge node or a sensing node, in the global map may be semantically related or semantically processed.

The far edge nodes 208 are each associated with a local map 212. The local map of one far edge node may be different from the map of another far edge node in the environment. Portions of the global map 226 are distributed as the local maps to the various far edge nodes and using the graph framework. Further, the local maps 212 may have higher resolution in some examples or higher levels of detail.

More specifically, a tree-based graph is built where the top graph node provides complete environment information at the lowest possible level-of-detail (e.g., the global map 226) and the leaves complement the parents with more detailed local information (e.g., the local map 212). Hence, it provides efficient processing, communication, and data compaction by avoiding carrying out operations on frivolous information.

As illustrated in FIG. 2, the node data 218 and 224 may include data from sensors 206 and 210 and interactions 216. The near edge node 202 may deliver Regions of Interest (RoIs) 220 and 222 when applicable to the various sensing nodes 204 and far edge nodes 208. In one example, the RoIs may be location based. When sending an RoI to a far edge node (or sensing node is applicable), the information within the RoI can be provided at the level-of-detail needed to improve the far edge performance as a function of the semantics. For example, for navigation purposes, the root node level of detail may suffice to inform the far edge node that there is a dynamic object on a blind spot so that the far edge node can be more cautious. In the context of object manipulation, observations of other nodes, such as sensing nodes or far edge nodes, can enhance the precision of the representation of the object. Thus, the RoI may include information relevant to the receiving far edge node and which may originate at other nearby sensing/far edge nodes.

The near edge node 202 can use semantics to mitigate the upload (near to far edge) rate required to improve far edge node performance. The near edge node 202 can use the global map semantics, decisions, far edge node positions, and actioning statuses to identify from which far edge nodes to download local observations. This downloaded information may be used in generating the RoIs ultimately delivered to a recipient far edge node. Further, the graph can be traversed to provide positions of the far edge nodes, last time of update, semantics, and oriented bounding boxes, which allows the graph to provide an orchestration or logistics engine with information to make decisions.

The near edge node 202 may also depend on external information (e.g., the node data 218, 224, interactions 216) to perform decision making and other logistics operations. The external information may be generated by sensors such as, but not limited to, cameras, depth sensors, LiDARS, RFID readers, motion sensors, or the like or combination thereof. Individual sensors, in general, cannot provide a complete observation of the environment. Further, sensing or static nodes may only provide environmental information and do not require decisions from the near edge node.

The node information 218, and 224 may be processed at the far edge nodes or provided in a raw form. The sensing nodes 204 may have some processing capabilities and may have their own local maps for efficiency. This allows the sensing nodes 204 to be viewed similar to the far edge nodes 208. However, some of the sensing nodes 204 may not interact with the environment in a manner that requires decisions from the near edge node 202.

The near edge node 202 is configured to build/update/maintain the global map 226 using the node data 218, 224 and the interactions 216. The map 226 can be used to make decisions.

Figure 3:
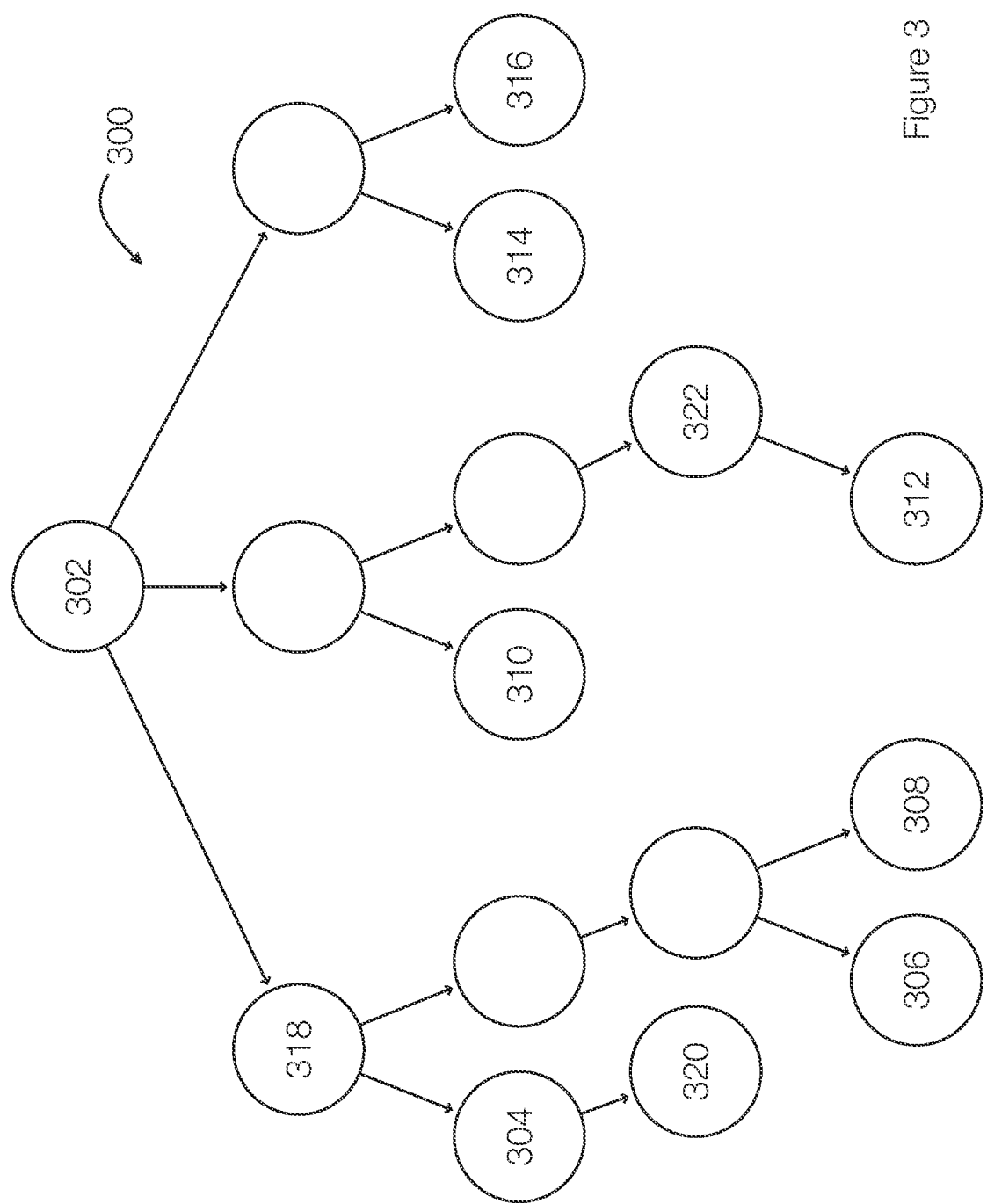
FIG. 3 discloses aspects of a global map.

FIG. 3 illustrates an example of a graph. The graph 300 may or may not have aspects of an octree hierarchy. Embodiments of the invention relate to a graph or map that, while related, builds and expands on the octree hierarchy.

The graph 300 includes a root graph node 302. The node 302 is a lowest depth node of the graph 300 and the leaf graph nodes 320, 306, 308, 310, and 312 refer to graph nodes without children nodes. The depth d of the graph 300 can be arbitrarily large. The relationships of objects in an environment may vary and change continually. However, the graph 300 allows information to be received and distributed efficiently and in a manner that better utilizes available resources at the near edge and far edge nodes.

As previously stated, a graph node may have a quintuplet form such as $n_i=(m_i, t_i, p_i, C_i, l_i)$. The root graph node 302 may be $n_0=(m_0, t_0, p_0=\emptyset, C_0=\{n_i|p_i=n_0\}, l_0=\emptyset)$.

The graph node 318 may be represented by $n_1=(m_1, t_1, p_1=n_0, C_0=\{n_i|p_i=n_1\}, l_1=\text{shelf})$. This demonstrates that the graph 300 includes a semantic aspect and illustrates that, in some embodiments, each graph node may correspond to a specific device or object in the environment. In other words, each graph node corresponds to a far edge node or a sensing node in one example. This allows relationships to be reflected in the graph 300 semantically. For example, the label $l_2$ of the node 304 may be shelf. Because the graph node 304 is a child of the graph node 318, this may reflect a relationship between the pallet and the shelf. In other words, the pallet is on the shelf. The label $l_3$ of the graph node 320 may be goods. This may reflect that the goods represented by the graph node 320 are on the pallet 304, which is on the shelf 318.

In another example, the label may also represent an interaction. For example, the label of the graph node 322 may be "open box" and the label of the graph node 312 may be goods. This may indicate that the box containing the goods is or has been opened. This may be a decision that was decided by the near edge node and provided to an object or far edge node that then opened the box. Opening the box is also an example of an interaction that may be reported back to the near edge node. Opening the box may be performed in response to an instruction of decision and may also be reported as an interaction. The semantics in the graph represented that the box was not open. The interaction resulted in a map update such that the semantics and graph nodes represented that the box is open.

Figure 4:
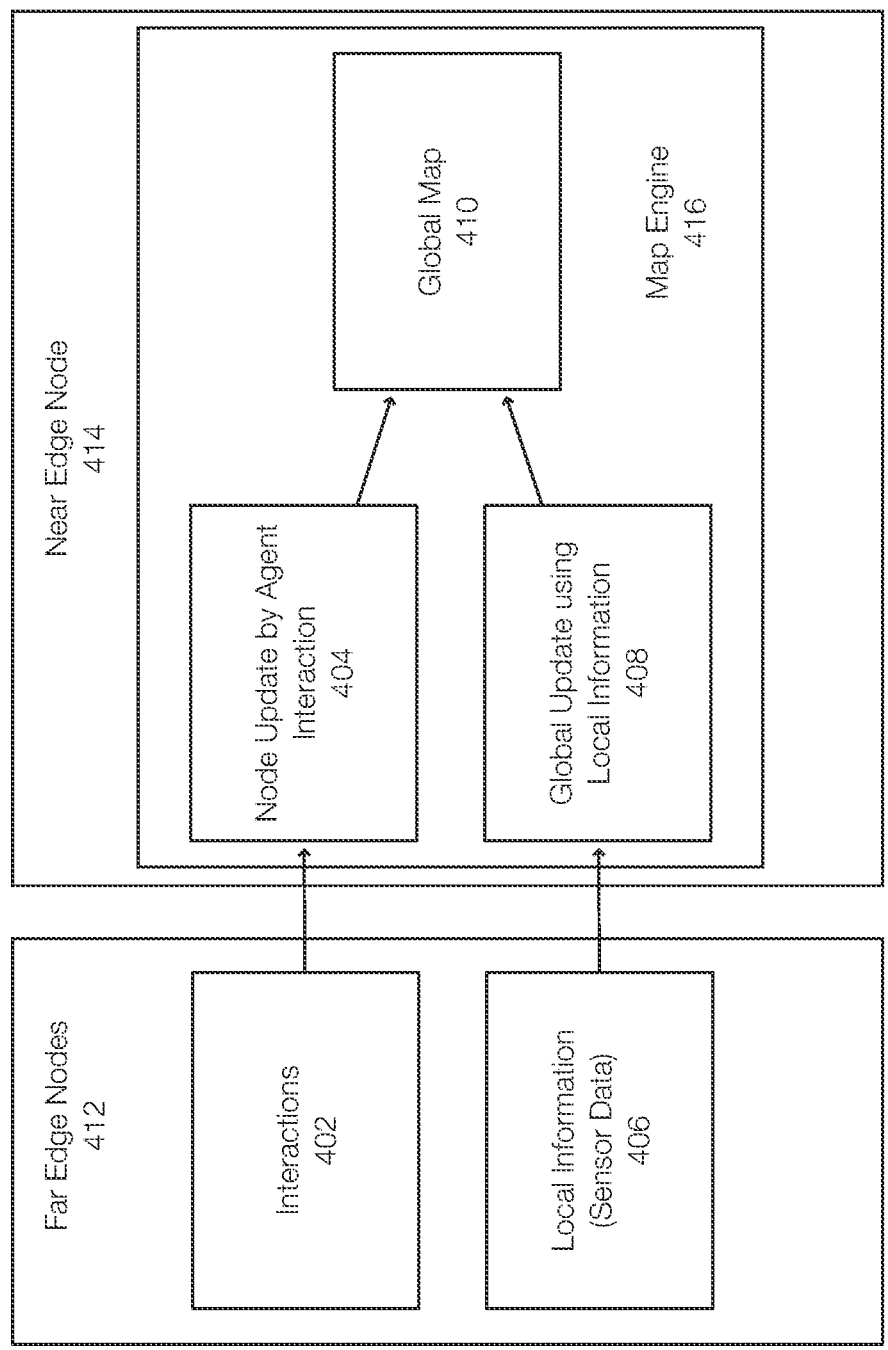
FIG. 4 discloses aspects of updating a global map and/or local maps.

FIG. 4 discloses aspects of graph operations including updating a graph. Once a tree or graph is created, such as the global map 410, the information generated in or collected from the environment may be used to maintain or update the global map 410.

The near edge node 414 receives inputs (sensing/far edge node information) including interactions 402 and local information (e.g., sensor data) 406 from the far edge nodes 412. The near edge node 414 includes a map engine 416 that updates the global map 410 using the received node information. A graph node update is performed by agent interaction 404 and using local information 408. More specifically, a far edge node may perform an action or interact with the environment. This update performed in response to this interaction may or may not be specific to the far edge node that performed the interaction. However, the update may update the graph node corresponding the far edge node that performed the interaction. Thus, the interactions may lead to updating a specific graph node in the map 410. However, the node information may also impact other graph nodes and result in corresponding updates. The local information 406 may be used to update the graph nodes in the global map 410.

For example, a graph node may indicate that a far edge node is carrying a second far edge node. IN the context of the graph, the graph node corresponding to the second far edge node is a child node of the graph node corresponding to the first far edge node. More specifically, this information indicates that the graph node $n_i$ is thus a child node of that agent (the reporting far edge node) and the global map or graph requires updating to reflect this parent-child relationship. Alternatively, the far edge node may report to have placed the node $n_i$ at some position (interaction). Thus, the global map is updated by removing the node $n_i$ from that agent (parent node) and the location of the node $n_i$ in the global map is then determined and the node is place accordingly. The sensor data may detect the presence of an object in the environment (a person walking therein). This sensor data may be used to update relevant nodes and/or issue instructions (e.g., avoid collisions with the person).

Embodiments of the invention allow measurements to be processed in the edge environment. Embodiments of the invention allow a near edge node to provide a part of the global state to an agent operating on a far edge node. The local update to a local map improves/optimizes the agent's performance by providing the agent (the far edge node) with relevant up-to-date global information. The information within or associated local update can be provided at the level-of-detail required to improve the far edge performance as a function of the semantics.

The far-edge nodes may have limited processing resources and may not be able to execute part of the global map processing. Data streams generated at the far edge nodes may be processed where possible prior to download to the near edge node. Because the near edge node collects or receives information from multiple sensing/far edge nodes, the near edge node can provide partial information of the global state (e.g., a 3D region or region of interest (RoI)) back to the agents on the far edge nodes. The RoIs optimize the performance of the agents operating on the far edge nodes by providing access to up-to-date global information.

The information within the RoI can be provided at the level of detail required to improve performance of the far edge nodes as a function of the semantics. For example, for navigation purposes, the root graph node level-of-detail may suffice to inform the far edge node that there is a dynamic object on a blind-spot so that the far edge can be more cautious in such situations. Another possibility is object manipulation, where observations of other far edge nodes can enhance the precision of the representation of the object.

Regarding when the RoI is provided, one option is for the far edge node to require such information on-demand. Another option is for the near edge node to define when the RoI is provided by leveraging on the far edge node informed status and position. By leveraging on semantics, it is possible to mitigate the upload (near to far edge node) rate required to improve the far edge node performance.

The near edge node can use the global map semantics, its decision, the far edge node positions, and actioning statuses to identify from which far edge nodes to download local observations. The graph can be efficiently traversed to provide the far edge node positions, last time of update, semantics, and oriented bounding boxes, hence allowing to efficiently feed an orchestration algorithm with proper information to make its decisions. Embodiments may evaluate a quality of information from a node or employ other operations, such as ray casting, to predict how useful the observation of a sensing node can be.

In addition to processing measurements or observations at the near edge or central node, measurements or observations may also be processed at the far edge nodes. For example, data may be compressed prior to transmission to the near edge node. However, these techniques require compute resources, and the processing/resource constraints of the nodes should be considered before employing these techniques.

Regarding a global update using local information, the graph G may be adapted with a sextuplet form such as $n_i=(m_i, t_i, p_i, C_i, l_i, u_i)$. The term $u_i$ may be the last time the graph node $n_i$ (and physical node) was updated.

Figure 5:
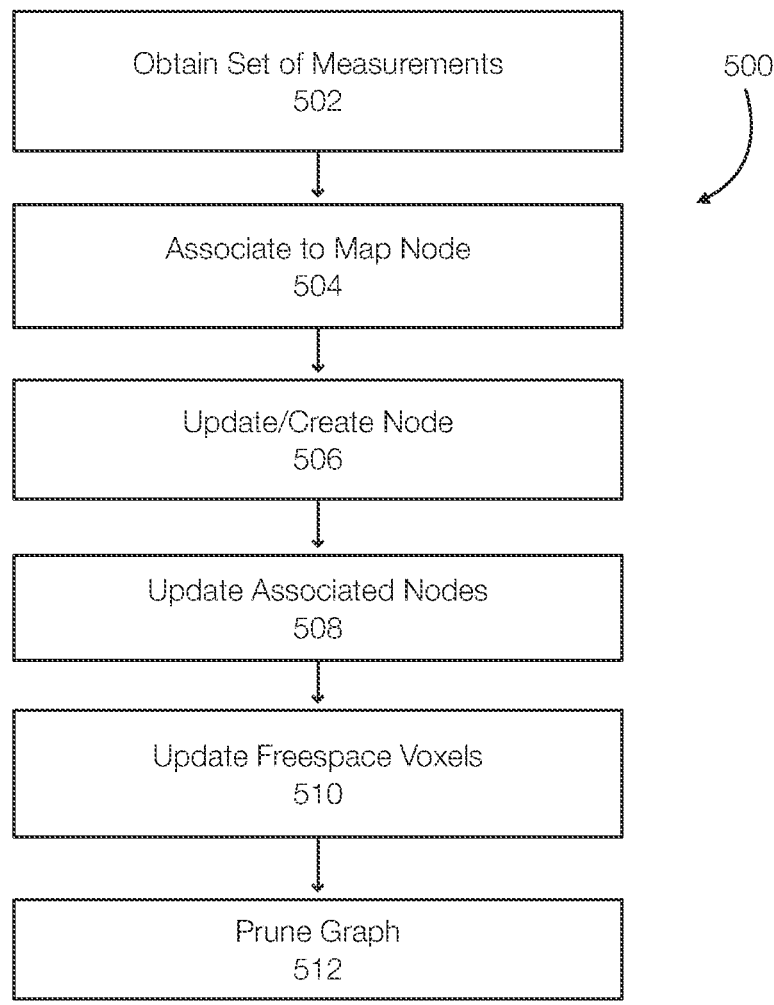
FIG. 5 discloses aspects of decoupling information into multiple levels of detail based on semantics.

FIG. 5 discloses aspects of logistics operations including map management operations, which may include updating a map such as a graph or tree. After discussing FIG. 5, FIGS. 6-10, which describe aspects of the method 500 in more detail are discussed.

The logistics or map management operations include updating the map globally and/or locally. In the method 500, measurements are obtained 502 or received at the near edge node. Node information from one or more far edge nodes and/or sensing nodes (or sensors) is an example of a set of measurements. Each sensor may generate a data stream (e.g., part of the set of measurements). In one example, the raw sensor data is processed at the far edge nodes. This may include, for example, normalizing the data, grouping the data into sets, or other functions that may depend on the application and/or compute resources available at the far edge nodes. Other processing that may be performed at the far edge nodes include compressing the data, sampling the data and sending samples only In one example, obtaining 502 a set of measurements may include processing data points. The processing depends on the sensor type providing the measurements. For example, LiDAR feeds can be grouped into segments, camera feeds can have its pixels segmented accordingly to semantic, or the like. Likewise, it is possible to process several sensor feeds when performing intensive processing on the near edge node. For instance, nearby point clouds can be merged before performing segmentation, which may allow more precise results. These operations are application specific but can be assumed to be performed efficiently.

Measurements arranged in this manner allow parallelization to be performed during subsequent processing in the method 500 at the near edge node, which is an example of a logistics pipeline. The pipeline may define semaphores to wait the processing of nearby observations before updating a node if methods employed during these steps benefits of more information, but other strategies can benefit of full parallelization.

Once the data measurements are obtained, the measurements or other data are associated 504 to a graph node in the graph or tree. More specifically, data may be received from a sensing node and embodiments of the invention may associate that data to a far edge node. If a door is closed, for example, a far edge node approaching the door may be updated accordingly. As previously described, the near edge node receives data from multiple sensing nodes and/or far edge nodes in the network and associating data to a graph node or to a relevant graph node is performed. In some instances, data may be associated with multiple graph nodes and ultimately shared with multiple corresponding far edge nodes. Data or measurements may be associated with a graph node using an association function $f_A$.

When associating the set of measurements, also referred to as observations, to a graph node, the method 500 may create or update a graph node 506. If no graph node is associated to the set of measurements, a graph node is created and placed in the graph. In one example, a list of graph nodes is evaluated. If an appropriate graph node is found, the graph node is updated.

Next, the associated graph nodes are updated 508. This may include updating a child graph node and/or parent graph nodes in the map. With regard to the OctoMaps in the nodes, the OctoMaps, including freespace voxels, may be updated 510. Finally, graph nodes whose probability of existence is lower than a threshold are pruned 512 from the graph.

Figure 6:
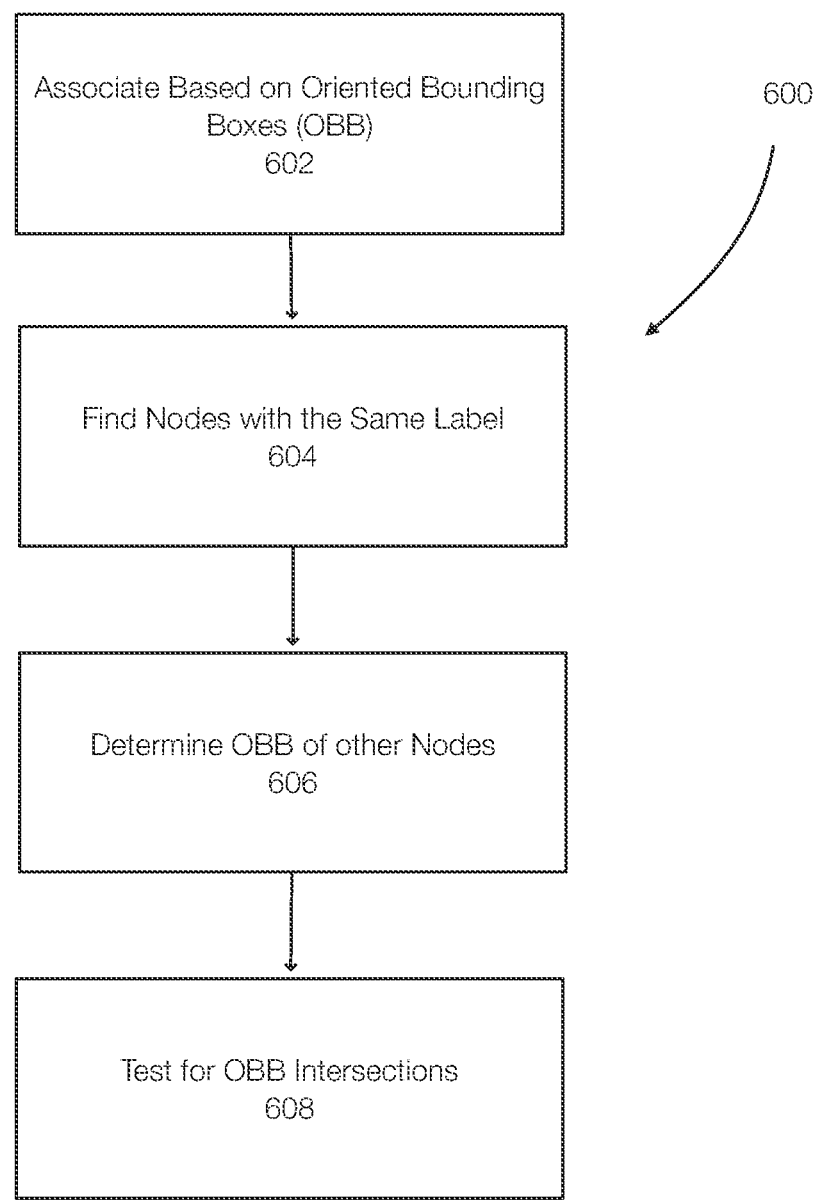
FIG. 6 discloses aspects of associating measurements to nodes.

FIG. 6 discloses aspects of an example association function, such as performed in 504 in FIG. 5. In the method 600, data may be associated 602 to graph nodes using oriented bounding boxes. An oriented bounding box, in one example, may be viewed as a parallelepiped that may include a far edge node and a portion of the environment. The form of the association function $f_A$ is arbitrary. A possible embodiment can rely on data-based methods for object detection or scene analysis techniques to account for the knowledge carried out by the previous measurements and to correct possible mistakes due to partial observations. For instance, each observation may be tested to each graph node with a compatible oriented bounding box and $f_A$ would return the graph node with highest likelihood that the observation is part of that graph node. A similar embodiment could be used to define the form of L and, provided that they share common factors of variation, a multi-task approach can be used to share knowledge between $f_A$ and L, allowing to improve the estimate of the semantics label and to tackle both tasks at once in 604.

Graph nodes with the same label are identified 604 and the oriented bounding boxes for other graph nodes may be determined 606. The method 600 may test for OBB intersections 608 with regard to the oriented bounding boxes. Ultimately, the method 600 then returns or identifies the most likely graph node (and/or physical node) for the measured data or observations.

A minimum $f_A$ likelihood threshold may be defined to allow observations due to new objects to be associated with their own corresponding graph nodes. Further, identifying the graph node may also include updating aspects of the graph nodes, such as some properties of the nodes' quintuplet (e.g., its label, reference frame, and parent node).

This allows local map updates to be provided to all far edge nodes if necessary. This may also identify far edge nodes from which data is retrieved.

Figure 7:
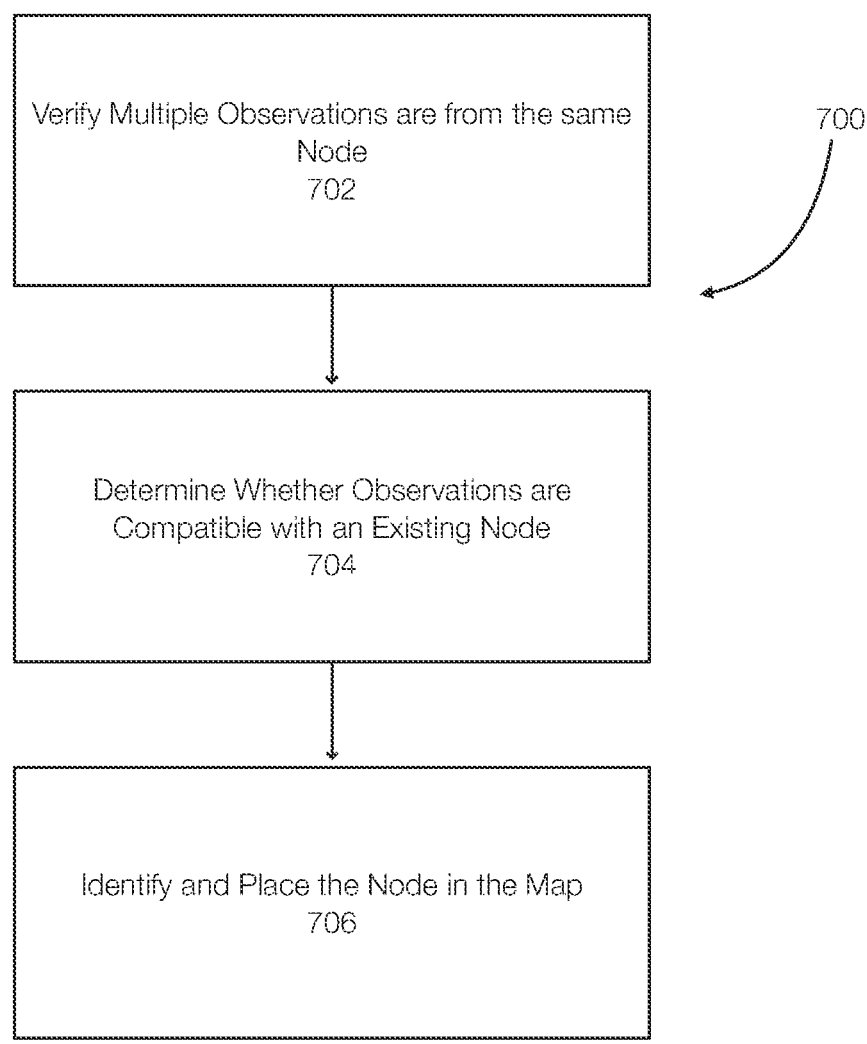
FIG. 7 discloses aspects of creating/updating nodes.

FIG. 7 discloses aspects of creating/updating a node in a graph. Generally, a graph node is created when the observations suggest that the object (a physical node) is not represented in the graph and is, in effect, a new far edge node. In one example, a graph node is created when a graph node cannot be located to update. When creating a new graph node on the graph (e.g., a new graph node $n_i$ on hierarchy M), embodiments of the invention determine where to place the graph node in the graph—the map.

In the method 700, a verification 702 is performed to ensure that the observations (e.g., the set of measurements) are from the same sensing or far edge node. This process of creating a new graph node is a combinatorial problem and embodiments of the invention may rely on heuristic rules to eliminate unlikely combinations. For example, the method may consider the size, bounding boxes, and general shapes of each semantic. This enables a data driven method for each semantic to feed with the observations. This allows the observations or set of measurements that are from the same far edge or sensing node to be identified. For example, sensor readings of mast height, combined with position data, may indicate that the measurements are from a forklift in a particular area.

Next, the method 700 determines 704 whether the observations are compatible with a graph node already available in the graph. In one example, records are kept regarding unobserved changes in far edge nodes. For example, changes in the far edge nodes performed by external agents may have been performed in a manner that was not tracked in the graph updating operations. Depending on the application, one embodiment may use heuristics. For example, RFID tags can be used to identify the far edge/sensing node. Thus, the measurements may come from a particular far edge/sensing node and the RFID tag may identify the graph node in the graph. In another example, computer vision methods can be used. If the observations are compatible with a known graph node, its position is updated.

The method then identifies and places 706 the graph node for the far edge node in the graph (e.g., r(. , .) plays a central role in this task). During the graph node creation/update operation 506, properties of the quintuplet (or sextuplet) may be generated or created.

Figure 8:
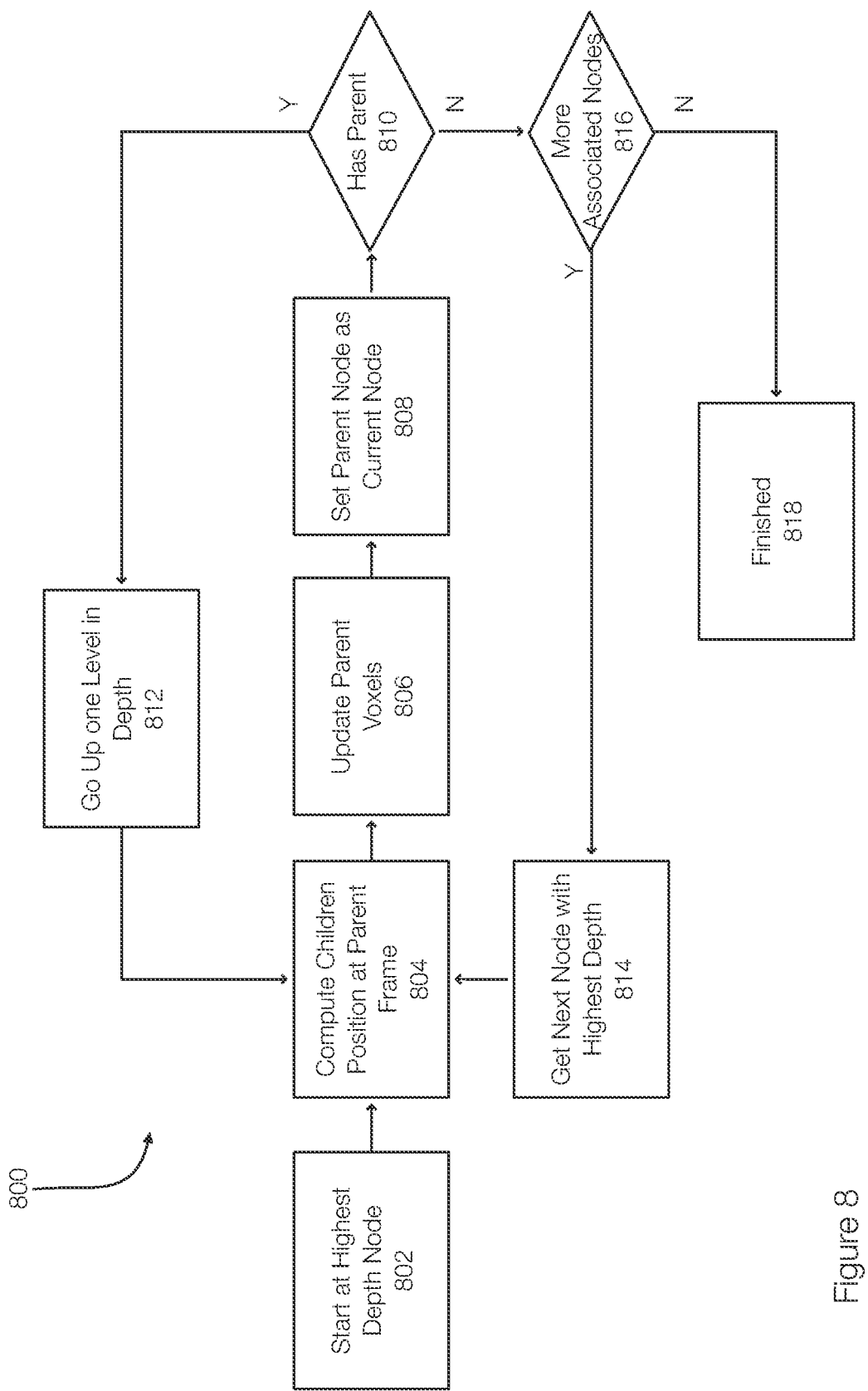
FIG. 8 discloses aspects of updating associated nodes.

Once the graph node creation/update operation has been performed, associated graph nodes are updated 508. FIG. 8 discloses aspects of updating associated graph nodes. Associated graph nodes may include child and/or parent graph nodes. Generally, updating associated graph nodes include updating properties $u_i$ and $m_i$ and/or other properties. The property $u_i$ is set to a current time of execution of the graph node update. With regard to updating the property $m_i$, this may include distributing the observations to far edge nodes based on the graph as a local map update. Thus, the local OctoMaps are updated.

In one example, updating the parent graph nodes of each associated node is performed so that the graph nodes present the actual observed state of the environment, including at the root graph node. The update may be performed as a bottom-up approach, starting at the graph node in the highest depth.

One aspect of embodiments of the invention is updating the parents of each associated graph node so that they present the actual observed state of the environment, particularly the root graph node. The update is carried out in a bottom-up approach, starting at the $l_A$ nodes with highest depth. This update keeps the correct level-of-detail for each semantic in the parent graph nodes. If a parent graph node has higher detail than a child graph node, the parent may represent the child with its own details. Otherwise, the child will be represented with lower detail on the parent node.

More specifically, the method 800 starts 802 updating at a highest depth graph node. Next, the positions of children graph nodes are determined 804 at the parent frame using $t_i$ (the reference frame of the graph node). Parent voxels are updated next 806. The parent graph node is then set 808 as the current graph node. If the current graph node has a parent (current graph node has a parent (Y at 810), go up one level in depth 812 and repeat the method. If the current graph node does not have a parent (N at 810) and there are more associated graph nodes (Y at 816), the graph node at the next highest depth is obtained 814 and the method returns to 804. Otherwise, the method 800 finished 818.

When sets of measurements are received, these measurements or observations provide information related to both free and occupied space. Updating free and occupied space on a local map corresponds to a fraction of the knowledge obtained in an observation. However, free space observations may span beyond the boundaries of the node associated with the observed points regarding occupied space. In one example, free space voxels are updated at graph nodes using a top-down approach. Generally, starting at the root graph node, a ray casting operation may be performed to update free space voxels of impacted graph nodes.

Figure 9:
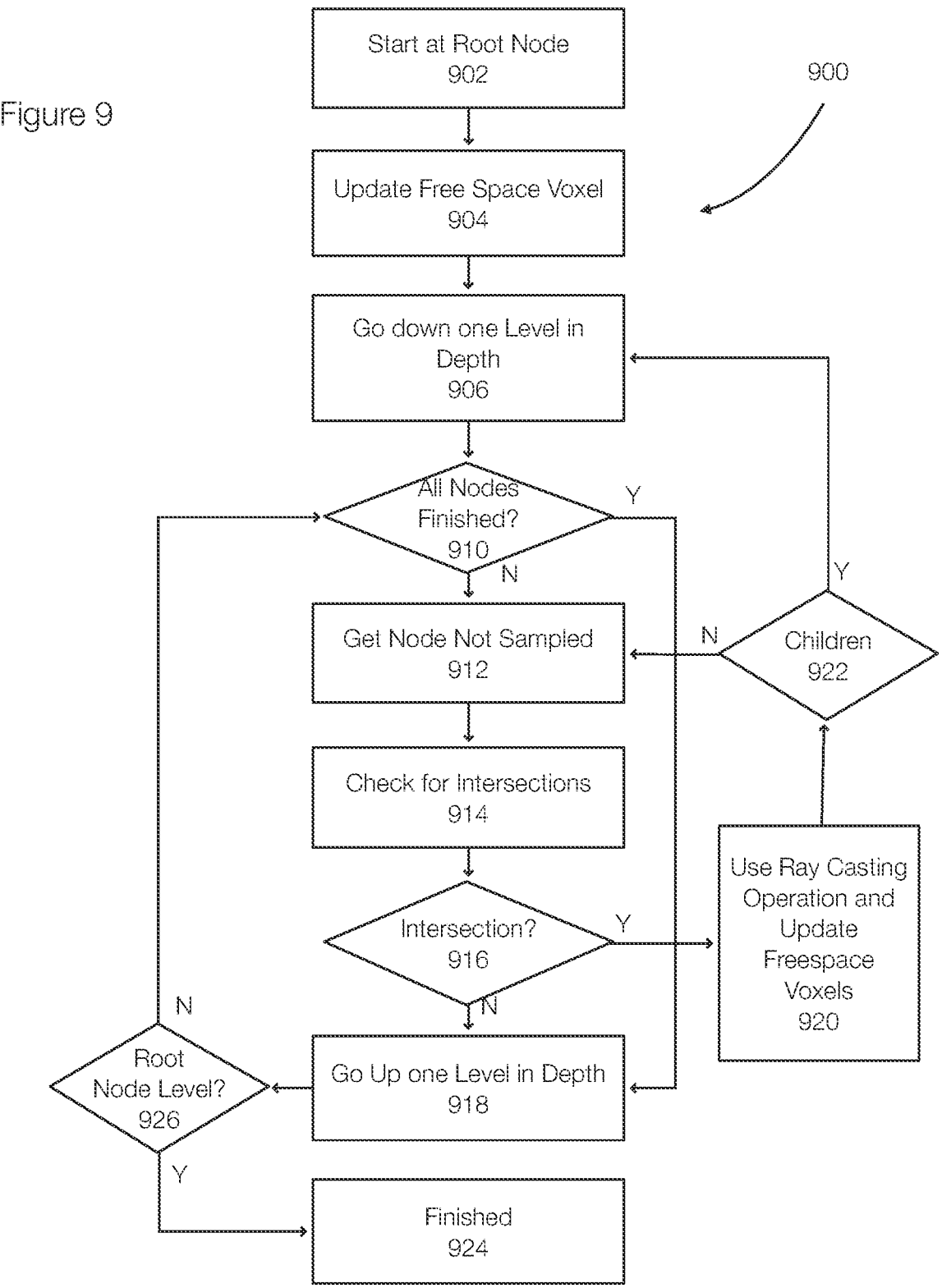
FIG. 9 discloses aspects of updating other nodes.

FIG. 9 discloses aspects of updating other graph nodes. The measurements may provide information related to both free and occupied space. FIG. 9 is a method for updating only free space voxels at graph nodes affected by the observations or measurements in a top-down approach. The method 900 starts 902 at a root graph node. Using ray casting or other method, free space voxels are updated 904 for the graph node.

The method 900 then goes down 906 one level in depth. Next, a graph node that was not sampled with respect to updating the graph nodes is retrieved 912 and the retrieved graph node is checked for intersections of ray casting and oriented bounding box 914. If there is an intersection (Y at 916), ray casting 920 is performed to update freespace voxels. If there are children graph nodes (Y at 922), the method 900 goes down one level in depth 906. If there are no children graph nodes (N at 922), another graph node that was not previously sampled is retrieved and a similar process of checking 914 for intersections is performed.

If there is no intersection (N at 916), the method goes up one level in depth 918. If at the root node level (Y at 926), the method 900 finished 924. If not (N at 926), the method repeats back to 910. This method 900 updates freespace voxels 510 throughout the full tree structure of the graph for graph nodes that are not graph nodes previously sampled or updated in 508.

Figure 10:
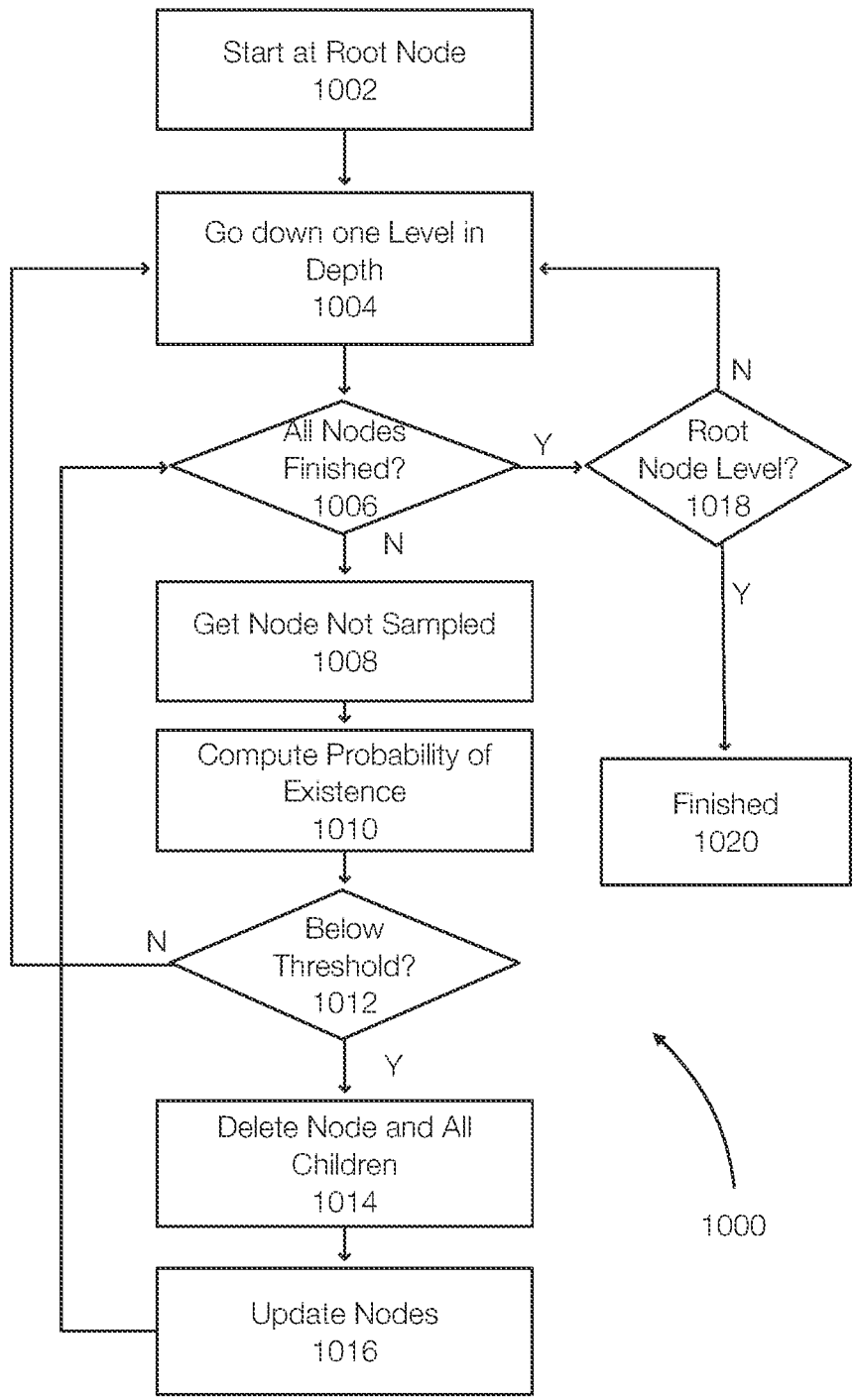
FIG. 10 discloses aspects of pruning nodes in the map.

FIG. 10 discloses aspects of pruning nodes from the graph. Unobserved changes in environment may require the ability to completely remove objects from the representation of the global state. Because all nodes are updated with their children information, a top-down approach may be performed to prune nodes from the graph.

The method 1000 starts 1002 at the root graph node. After going down 1004 one level in depth and determining that all graph nodes have not been processed (N at 1006), a graph node that was not sampled in the context of updating/creating graph nodes is retrieved or accessed in 1008. The probability of existence is then determined 1010. If below a threshold (Y at 1012), the graph node and all children graph nodes thereof are deleted 1014 and the graph nodes are updated 1016 as needed. The method then returns to 1006 to determine whether all graph nodes have been processed.

If the existence of a graph node is not below a threshold (N at 1012), the method 1000 goes down 1004 a level in depth and continues the method. When all graph nodes are processed (Y at 1006) and the method is at the at the root node level (Y at 1018), the method ends. Otherwise, the method 1000 goes down a level in depth 1004 and continues as discussed.

The goal is to identify graph nodes that are unlikely to exist, e.g., due to unobserved interactions, Embodiments of the invention keep a multi-resolution global state of the environment readily available to be provided on-demand and/or processed at the required level-of-detail by leveraging semantic information.

Embodiments of the invention enable resource efficient representation. The proposed representation builds on Octo-Maps and Octree Hierarchies in a manner that reduces resource constraints. Further, information is readily available for processing as parent nodes keep a simpler representation of the environment.

The disclosed representation builds upon two efficient 3D map solutions: OctoMap and Octree Hierarchy. By addressing their limitations, embodiments of the invention define a method to reduce resource strains to execute the algorithms in the near edge node.

Further, embodiments of the invention support multiple resolutions. Applications requiring higher level-of-detail for determined semantics or nodes can acquire such information by accessing the information on the graph.

Communication is also efficient by mitigating the upload rate or RoIs to far edge nodes or agents by avoiding the communication of frivolous information.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: obtaining a set of measurements from sensing nodes in an environment that includes the sensing nodes and far edge nodes, wherein the set of measurements are received from at least some of the sensing nodes and the sensing nodes and far edge nodes are represented in a graph as graph nodes, associating the set of measurements to a graph node in the graph, wherein the graph node corresponds to a far edge node, updating the graph node in the graph associated with the set of measurements and updating the corresponding far edge node with a local update, updating graph nodes associated with the graph node that was updated, and updating graph nodes not associated with the graph node that was updated.

Embodiment 2. The method of embodiment 1, wherein each of the graph nodes is represented by a sextuplet including a map, a frame of reference, a parent node, a set of child nodes, a label, and an update timestamp.

Embodiment 3. The method of embodiment 1 and/or 2, wherein the map in each of the graph nodes comprises an octomap.

Embodiment 4. The method of embodiment 1, 2, and/or 3, further comprising pruning the graph of graph nodes whose likelihood of existing are below a threshold value.

Embodiment 5. The method of embodiment 1, 2, 3, and/or 4, wherein the local update includes a region of interest.

Embodiment 6. The method of embodiment 1, 2, 3, 4, and/or 5, further comprising creating a new graph node in the graph when the set of measurements are not associated with an existing graph node in the graph.

Embodiment 7. The method of embodiment 1, 2, 3, 4, 5, and/or 6, wherein updating the graph node includes verifying that the set of measurements are from a particular semantic class and determining whether the set of measurements are compatible with an existing graph node in the graph.

Embodiment 8. The method of embodiment 1, 2, 3, 4, 5, 6, and/or 7, further comprising updating parent nodes in a bottom-up approach, updating other nodes in a top-down approach, wherein updating the other nodes includes updating freespace voxels.

Embodiment 9. The method of embodiment 1, 2, 3, 4, 5, 6, 7, and/or 8, wherein child nodes have a higher level of detail than parent nodes in the graph and the root node is a single node with a complete and compact environment representation.

Embodiment 10. A method for performing any of the operations, methods, or processes, or any portion of any of these, or any combination thereof, disclosed herein.

Embodiment 11. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
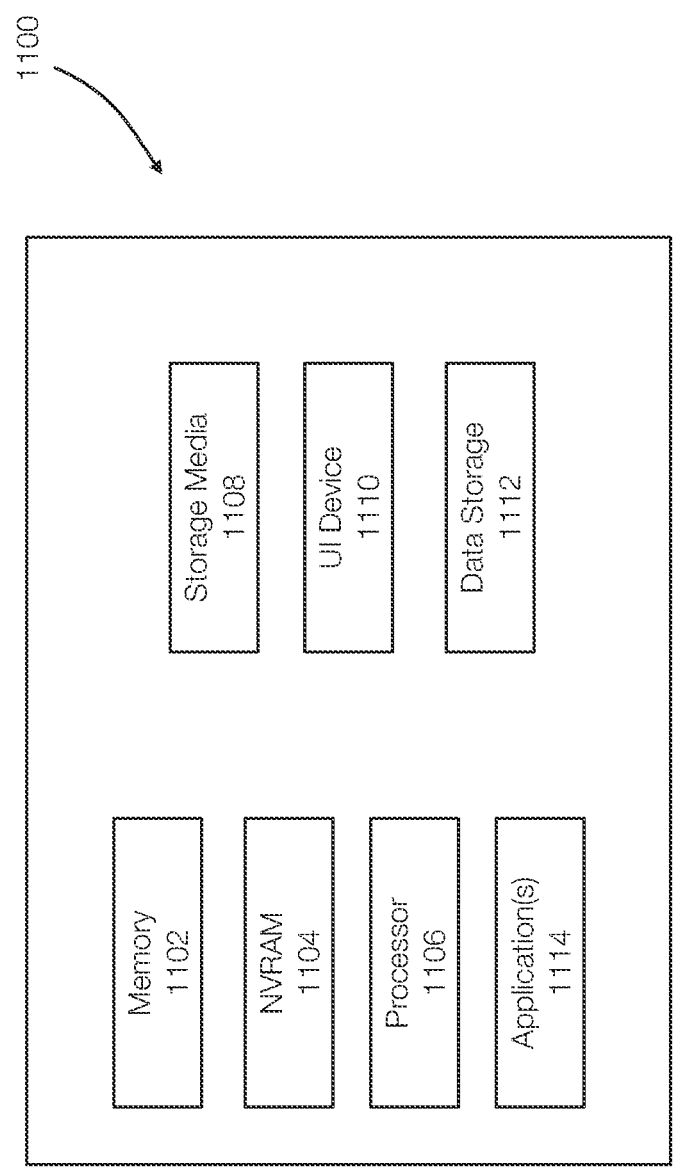
FIG. 11 discloses aspects of a computing device, system, or entity.

With reference briefly now to FIG. 11, any one or more of the entities disclosed, or implied, by the Figures and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 11.

In the example of FIG. 11, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI device 1110, and data storage 1112. One or more of the memory components 1102 of the physical computing device 1100 may take the form of solid-state device (SSD) storage. As well, one or more applications 1114 may be provided that comprise instructions executable by one or more hardware processors 1106 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    obtaining a set of measurements from sensing nodes in an environment wherein the sensing nodes and far edge nodes are represented in a graph as graph nodes, the graph identifying parent-child relationships between at least some of the graph nodes, wherein the child nodes having a higher level of detail than parent nodes in the graph;
    associating the set of measurements to a graph node in the graph, wherein the graph node corresponds to a far edge node, wherein a new graph node is created when the set of measurements is not associated to any of the graph nodes;
    updating the graph node in the graph associated with the set of measurements;
    receiving node data a far-edge nodes in the environment;
    updating the graph based on interactions included in the node data, wherein, when the node data includes an interaction, the interaction determines whether a child node is added to the graph node or a child node is removed from the graph node and relocated in the graph;
    processing the set of measurements and the node data to generate a local update for the far edge node;
    updating the corresponding far edge node with the local update;
    updating graph nodes associated with the graph node that was updated; and updating graph nodes not associated with the graph node that was updated.

2. The method of claim 1, wherein each of the graph nodes is represented by a sextuplet including a map, a frame of reference, a parent node, a set of child nodes, a label, and an update timestamp.

3. The method of claim 2, wherein the map in each of the graph nodes comprises an octomap.

4. The method of claim 1, further comprising pruning the graph of graph nodes whose likelihood of existing are below a threshold value.

5. The method of claim 1, wherein the local update includes a region of interest.

6. The method of claim 1, wherein updating the graph node includes verifying that the set of measurements are from a particular semantic class and determining whether the set of measurements are compatible with an existing graph node in the graph.

7. The method of claim 1, further comprising updating parent nodes in a bottom-up approach, updating other nodes in a top-down approach, wherein updating the other nodes includes updating freespace voxels.

8. The method of claim 1, wherein the root node is a single node with a complete and compact environment representation.

9. A non-transitory storage medium having stored therein instructions that are executable by one or more hardware processors to perform operations comprising:
 obtaining a set of measurements from sensing nodes in an environment wherein the sensing nodes and far edge nodes are represented in a graph as graph nodes, the graph identifying parent-child relationships between at least some of the graph nodes, wherein the child nodes having a higher level of detail than parent nodes in the graph;
 associating the set of measurements to a graph node in the graph, wherein the graph node corresponds to a far edge node, wherein a new graph node is created when the set of measurements is not associated to any of the graph nodes;
 updating the graph node in the graph associated with the set of measurements;
 receiving node data a far-edge nodes in the environment;
 updating the graph based on interactions included in the node data, wherein, when the node data includes an interaction, the interaction determines whether a child node is added to the graph node or a child node is removed from the graph node and relocated in the graph;
 processing the set of measurements and the node data to generate a local update for the far edge node;
 updating the corresponding far edge node with the local update;
 updating graph nodes associated with the graph node that was updated; and
 updating graph nodes not associated with the graph node that was updated.

10. The non-transitory storage medium of claim 9, wherein each of the graph nodes is represented by a sextuplet including a map, a frame of reference, a parent node, a set of child nodes, a label, and an update timestamp.

11. The non-transitory storage medium of claim 10, wherein the map in each of the graph nodes comprises an octomap.

12. The non-transitory storage medium of claim 9, further comprising pruning the graph of graph nodes whose likelihood of existing are below a threshold value.

13. The non-transitory storage medium of claim 9, wherein the local update includes a region of interest.

14. The non-transitory storage medium of claim 9, wherein updating the graph node includes verifying that the set of measurements are from a particular semantic class and determining whether the set of measurements are compatible with an existing graph node in the graph.

15. The non-transitory storage medium of claim 9, further comprising updating parent nodes in a bottom-up approach, updating other nodes in a top-down approach, wherein updating the other nodes includes updating freespace voxels.

16. The non-transitory storage medium of claim 9, wherein the root node is a single node with a complete and compact environment representation.

\* \* \* \* \*